(12) United States Patent
Mukhopadhyay et al.

(10) Patent No.: US 8,968,877 B2
(45) Date of Patent: Mar. 3, 2015

(54) BARRIER MATERIALS FOR MIRROR ASSEMBLIES

(75) Inventors: Sudip Mukhopadhyay, Berkeley, CA (US); David Nalewajek, West Seneca, CA (US); Desaraju Varaprasad, Sunnyvale, NY (US); Awdhoot Vasant Kerkar, Rockaway, NJ (US)

(73) Assignee: Honeywell International Inc., Morristown, NJ (US)

( * ) Notice: Subject to any disclaimer, the term of this patent is extended or adjusted under 35 U.S.C. 154(b) by 370 days.

(21) Appl. No.: 13/397,208

(22) Filed: Feb. 15, 2012

(65) Prior Publication Data

US 2012/0208007 A1 Aug. 16, 2012

Related U.S. Application Data

(60) Provisional application No. 61/443,544, filed on Feb. 16, 2011.

(51) Int. Cl.
| | |
|---|---|
| *B05D 1/02* | (2006.01) |
| *B05D 3/02* | (2006.01) |
| *C09D 127/12* | (2006.01) |
| *F24J 2/10* | (2006.01) |
| *G02B 5/08* | (2006.01) |
| *G02B 1/10* | (2006.01) |

(52) U.S. Cl.
CPC ............. *G02B 5/0808* (2013.01); *B05D 3/02* (2013.01); *B05D 1/02* (2013.01); *C09D 127/12* (2013.01); *G02B 1/105* (2013.01); *F24J 2002/1071* (2013.01)
USPC ...... 428/421; 428/339; 427/385.5; 427/427.4

(58) Field of Classification Search
None
See application file for complete search history.

(56) References Cited

U.S. PATENT DOCUMENTS

| | | | |
|---|---|---|---|
| 4,929,523 A | 5/1990 | Kitayama et al. |
| 5,171,731 A | 12/1992 | Inagaki et al. |
| 5,253,105 A | 10/1993 | Paul et al. |
| 6,075,200 A | 6/2000 | O'Neill |
| 6,335,479 B1 | 1/2002 | Yamada et al. |
| 6,559,070 B1 | 5/2003 | Mandal |
| 7,491,486 B2 | 2/2009 | Mikoshiba et al. |
| 2004/0020601 A1 | 2/2004 | Zhao et al. |

(Continued)

FOREIGN PATENT DOCUMENTS

| | | |
|---|---|---|
| EP | 2101119 A1 | 9/2009 |
| WO | 2010078289 A2 | 7/2010 |
| WO | 2011122661 A1 | 10/2011 |

OTHER PUBLICATIONS

C.E Kennedy, et al., "Analysis of accelerated exposure testing of thin-glass mirror matrix," Proceedings of 2005 International Solar Energy Conference (ISEC2005), Aug. 6-12, 2005, Orlando, FL (US).

*Primary Examiner* — Ramsey Zacharia
(74) *Attorney, Agent, or Firm* — Bruce Bradford

(57) ABSTRACT

Provided herein is a reflective optical construction containing a fluoropolymer barrier layer, wherein the fluoropolymer is selected from the group consisting of homopolymers and copolymers of at least one tetrafluoropropene or pentafluoropropene, preferably 2,3,3,3-tetrafluoropropene. Also disclosed is a method of forming a reflective optical construction including (a) applying a barrier layer comprising one or more fluoropolymers selected from the group consisting of homopolymers and copolymers of at least one tetrafluoropropene or pentafluoropropene, and (b) curing.

17 Claims, 3 Drawing Sheets

(56) References Cited

U.S. PATENT DOCUMENTS

| | | |
|---|---|---|
| 2004/0082699 A1 | 4/2004 | Brown |
| 2008/0090174 A1 | 4/2008 | Mikoshiba et al. |
| 2008/0198457 A1* | 8/2008 | Sakai et al. .................. 359/507 |
| 2010/0055448 A1 | 3/2010 | Tomura et al. |
| 2010/0108057 A1 | 5/2010 | Cummings et al. |
| 2010/0177406 A1 | 7/2010 | Walker |
| 2010/0195197 A1 | 8/2010 | Usami |
| 2011/0097529 A1 | 4/2011 | Durali et al. |
| 2011/0177281 A1 | 7/2011 | Watanabe et al. |
| 2011/0180823 A1 | 7/2011 | Usami |

\* cited by examiner

PRIOR ART MIRROR ASSEMBLY

BARRIER MATERIALS FOR MIRROR ASSEMBLIES

CROSS-REFERENCES TO RELATED APPLICATIONS

This application is related to and claims the priority benefit of U.S. Provisional Application No. 61/443,544, filed on Feb. 16, 2011, which is incorporated herein by reference.

FIELD OF THE INVENTION

The present invention relates to fluoropolymer barrier layers for the protection of reflective layers in mirror assemblies.

BACKGROUND OF THE INVENTION

The basic principle underlying solar-thermal electricity generation (concentrated solar power—CSP) is the following: energy from the sun either directly or indirectly heats water, which vaporizes, and the resulting steam drives a turbine whose motion is converted into electricity in a generator. One advantage of the power generated by CSP units is that it is completely $CO_2$ free, and therefore has a negligible carbon footprint.

In order to achieve the high temperatures required to heat the water, the solar radiation must be concentrated. CSP plants concentrate solar energy using mirrors distributed across a small area. The four major CSP technologies include parabolic troughs, linear fresnel, power towers, and dish/engine. Parabolic trough collectors represent the most advanced technology for concentrating solar energy. These troughs are typically more than 1,300 feet in length and are made up of parabolically shaped mirror segments. The curvature of the mirrors allows them to concentrate the sun's direct beam radiation onto a linear receiver.

Current parabolic trough power plants use glass mirror panels. The mirrors are typically second-surface silvered glass mirrors, which means that the reflective metal layer, preferably a silver layer, is on the backside of the glass. The glass is typically a 4-millimeter-thick, special low iron, or white glass, with a high transmittance. These mirrors will frequently have a solar-weighted specular reflectivity of about 93.5%. Heretofore, a special multilayer paint coating was commonly used to protect the reflective metal layer on the back of the mirror. In a typical configuration, each mirror panel is approximately 2 square meters in area.

The mirrors on most CSP systems are made of silvered glass because of silver's high solar reflectivity (93%), relatively low cost, and high durability. The most common construction technique involves laminating a thin, silver mirror to a heavier glass backing structure. Other materials that have been used as the reflectors in solar concentrators include silvered polymer films and augmented aluminum reflectors. The reflective layer may also include a copper back layer for long term durability.

Both the silver reflective layer and copper back layers are prone to air oxidation. Moisture can also degrade these metal-containing layers, as water facilitates the corrosion. In particular, such external elements can cause the degradation and destruction of the silver or other metal contained in the reflective layer over time, as evidenced by tarnishing, discoloration, breakdown, and delamination, resulting in the loss of the mirror's reflectivity. Thus, as appreciated in the current state of the art, the metal layers have heretofore been commonly protected with at least two paint layers plus a UV/moisture protection layer backing the paint layers. The paints typically used for this purpose are lead-based paints.

Applicants have come to appreciate an incentive to remove the paint, and in particular the lead-containing components, completely for environmental reasons. High cost is also an issue for multi-layer coatings that have been heretofore used. Therefore, applicants have come to appreciate a need and to formulate a desire to replace the multiple paint layers heretofore commonly used with a layer of a single coating or film that can provide the barrier protection. The present invention addresses these needs and desires, among others.

SUMMARY

Provided herein are barrier coatings, barrier films and barrier coating solutions, reflective optical constructions that employ barrier coatings/films, and improved processes for preparing barrier coatings, barrier films and barrier coating solutions.

One aspect of the present invention provides reflective optical constructions comprising an optically transparent substrate containing a reflective layer disposed on the back of the substrate and a barrier coating or film disposed on at least a portion of, and preferably over the entirety, of at least the back surface of the reflective layer. In one embodiment, the barrier coating/film is formed from a polymer, and preferably a thermosetting polymer, that contains a substantial component comprising fluoropolymer, and even more preferably a substantial component of which comprises a polymer or polymeric segment represented by the following Formula (I):

wherein n is from about 10 to about 2,500, $R_1$, $R_2$, and $R_3$ are independently selected from H and F. Preferably in certain embodiment, the polymer is a polymer substantially according to Formula (I) having a molecular weight of from about 2,000 and about 200,000 Daltons.

Another aspect of the present invention provides a barrier coating or film comprising at least one polymer comprising, and preferably consisting essentially of segments that are homopolymeric, copolymeric, terpolymeric and the like which are derived in at least substantial proportion from a tetrafluoropropene or a pentafluoropropene monomeric compound. In one embodiment, the tetrafluoropropene or pentafluoropropene monomer includes at least one compound according to formula $CF_3CR_1=CR_2R_3$, wherein $R_1$, $R_2$, and $R_3$ are each independently selected from H and F.

Another aspect of the present invention provides methods of forming a reflective optical construction by applying a barrier coating solution onto a reflective layer. In certain preferred embodiment, the applying step comprises applying a barrier coating solution onto a reflective layer that is disposed on the back of an optically transparent substrate. The methods also preferably comprise curing the coating solution to form a cured coating or protective film on the ref elective layer. In certain embodiments, the barrier coating solution and/or cured coating includes at least one polymer selected from the group consisting of homopolymers, copolymers, terpolymers and the like that comprise in substantial proportion, and preferably consist essentially of polymeric material derived from tetrafluoropropene monomer, pentafluoropropene monomer, and combinations of these. In certain preferred embodiments, curing is performed at a temperature of from about 60° C. to about 350° C.

DETAILED DESCRIPTION OF PREFERRED EMBODIMENTS

Surprisingly, it has now been found that fluorinated polymers, preferably fluoropolymers that contain substantial portions or segments, formed from tetrafluoropropene monomer, and/or pentafluoropropene monomer, particularly 2,3,3,3-tetrafluoropropene ("HFO-1234yf") can be used advantageously as a protective layer or film for the reflective layer in mirror assemblies, preferably as a replacement for and instead of multiple paint layers, as well as the UV/Moisture adhesive layers. The fluorinated polymers of the present invention can also be used as a thin coating on the upper glass surface as a barrier layer.

As used herein, the term "reflective optical construction" encompasses any mirror-like assembly which redirects electromagnetic radiation, particularly sunlight. Preferred aspects of the present invention provide a reflective optical construction containing a barrier layer comprising a polymer as described herein, and preferably a fluoropolymer, and even more preferably a polymer formed according to Formula (I), wherein the reflective optical construction demonstrates a substantially unchanged level of optical performance and excellent durability after exposure to at least one of, and preferably each of, the following performance test conditions: (1) 85° C. at 85 relative humidity for 1,000 hours; (2) standard QUV Accelerated Weathering testing conditions (e.g., ASTM G154 and/or AATCC TM186); and (3) 45° C. at 100% relative humidity for 1,000 hours. In preferred embodiments, the polymer and preferably the fluoropolymer as applied produces a contact angle in the range of from about 110 to about 130 degrees.

Figure 1:
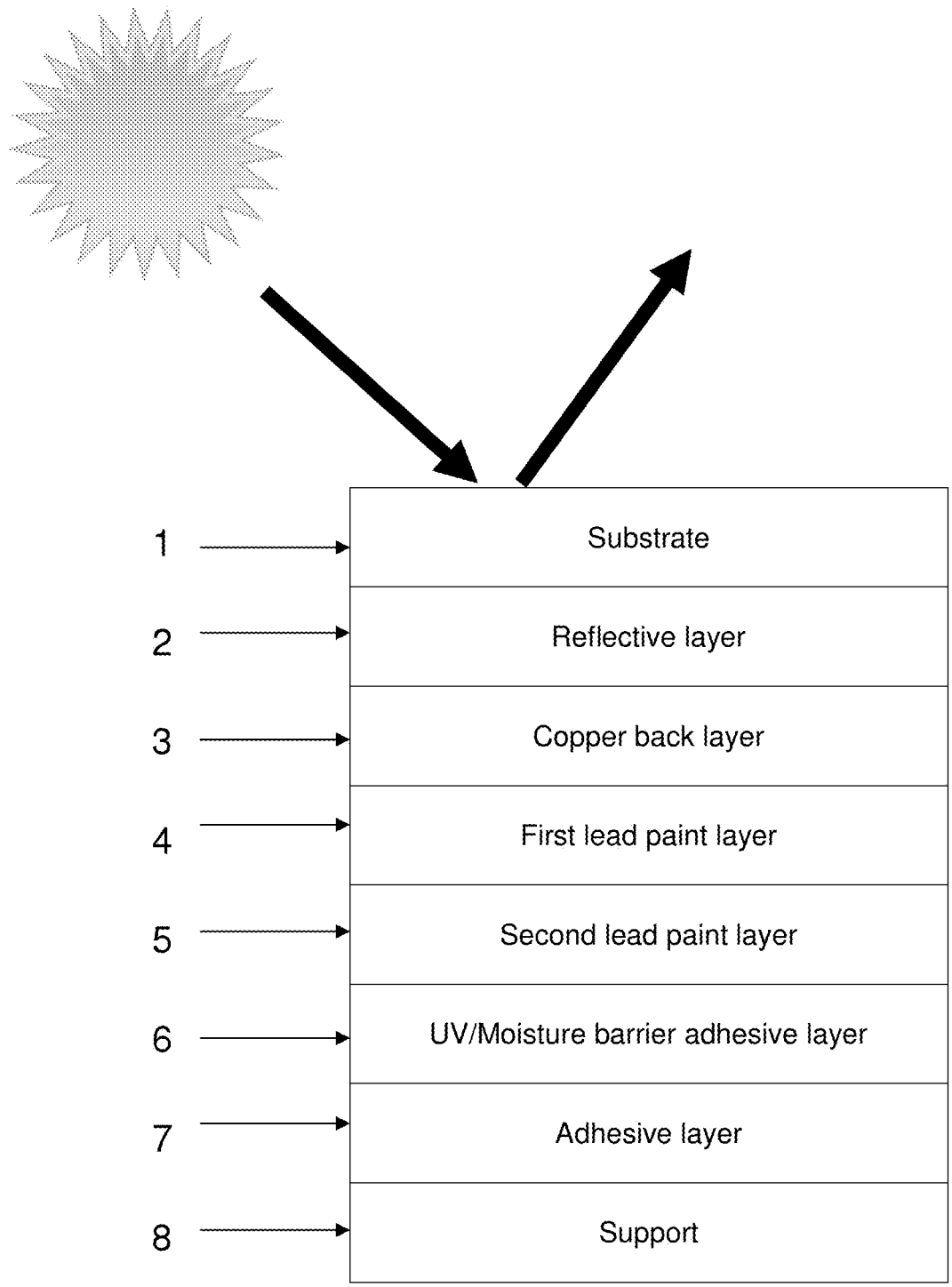
FIG. 1 is a schematic depiction of an art-standard multi-layer mirror assembly.

In certain embodiments, the reflective optical construction is included within a multi-layer CSP mirror assembly. A typical CSP mirror assembly of the state of the art is presented schematically in. FIG. 1. The multiple layers typically include a substrate 1, a reflective layer 2, a copper layer 3, at least two lead paint layers 4-5, a UV/moisture barrier adhesive layer 6, an adhesive layer 7, and a support 8. The substrate has a first side for gathering solar energy and a second side opposite the first side. The substrate may be flat or parabolically curved if intended to focus the solar radiation. The reflective layer is disposed on the back of the second side of the substrate and reflects the solar energy gathered by the first side being transmitted through the substrate to the second side. The lead paint layers 4-5 typically have lead contents of 2.5-20% for the first paint layer, and 1-10% for the second paint layer. Taken together, the lead paint layers 4-5 and the UV/moisture barrier adhesive layer 6 are designed to shield the reflective layer 2 and copper layer 3 from UV radiation, gases, and moisture.

Figure 2:
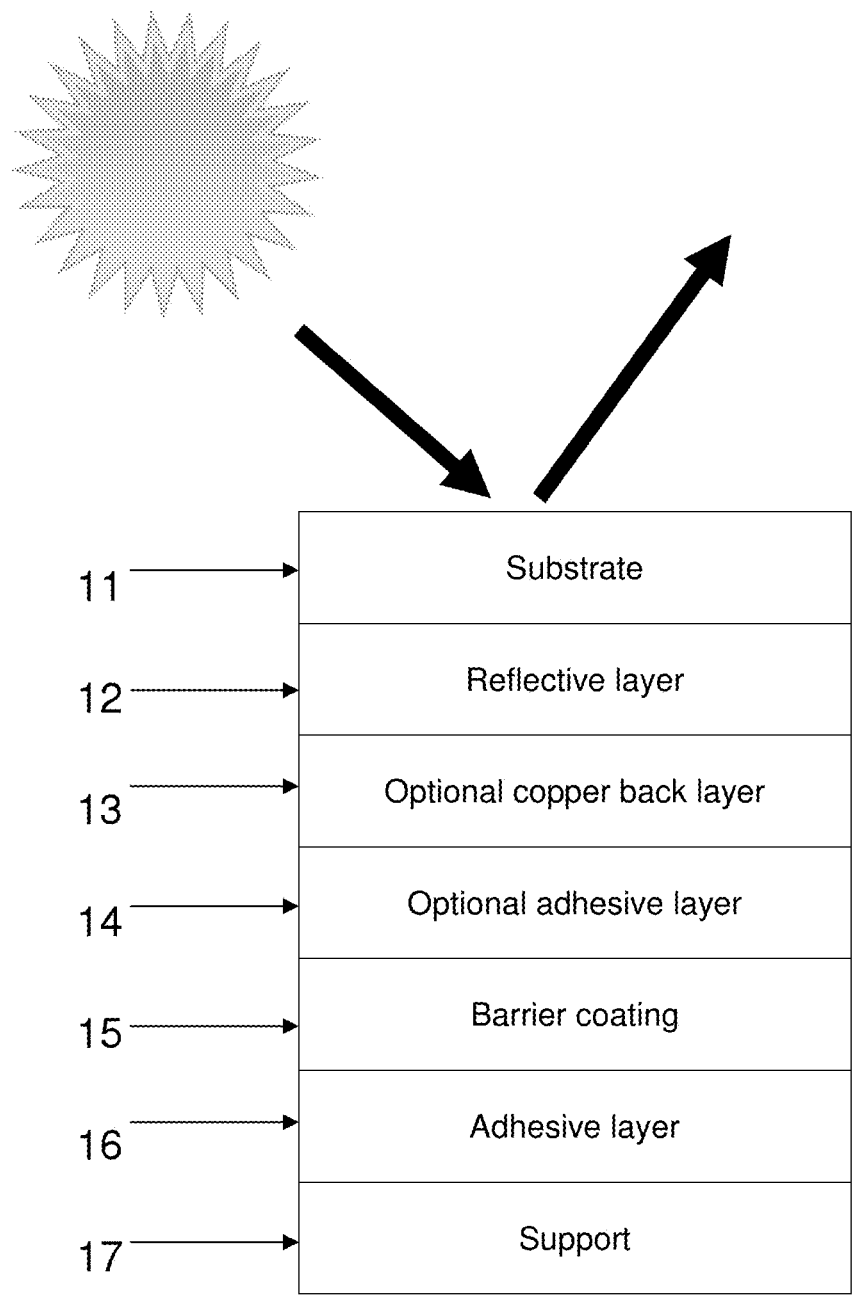
FIG. 2 is a schematic depiction of an embodiment of a multi-layer mirror assembly containing a barrier coating in accordance with the present invention.

As shown in FIG. 2, Applicants have surprisingly discovered that the reflective layers of such optical constructions can be protected by a barrier layer, e.g., a coating or film, that comprises, and even more preferably consists essentially of a barrier coating 5, which in preferred embodiments is a single, unitary layer or coating of the present fluoropolymer. Such a construction according to the present invention provides substantial economic and environmental advantages. For example, the elimination of a potential lead pollutant in the lead improves the environmental impact caused by CSP mirror assemblies.

The barrier coating also protects the reflective optical construction or mirror assembly from degradation caused by exposure to environmental factors, including gases and/or water. Atmospheric gases such as oxygen and ozone corrode the metal layers, particularly the silver reflective layer. Further, gaseous pollutants found in the environment, such as sulfur oxides and nitrogen oxides, can contribute to corrosion. In addition, moisture facilitates the corrosion process. However, the fluoropolymeric barrier coating according to the present invention is capable of effectively protecting the reflective layer from the effects of such environmental factors.

With reference to FIG. 2, in one aspect the present invention provides a mirror assembly including a substrate 11, a reflective layer 12 optionally including a copper back layer 13 and an adhesive layer 14, a barrier coating layer 15, an adhesive layer 16, and a support 17. The substrate may be a low-iron glass substrate or a barrier coated low-iron glass substrate and having a thickness of about 1 mm to about 4 mm. The reflective layer may comprise any metal which provides a mirrored surface and reflects incident light, and in preferred embodiments has a thickness of about 100 microns to about 5 mm. Preferred metals for the metal layer include silver and aluminum. The support may be formed of glass, ceramic, stainless steel, aluminum, or other material capable of bearing the weight of the mirror assembly.

Figure 3:
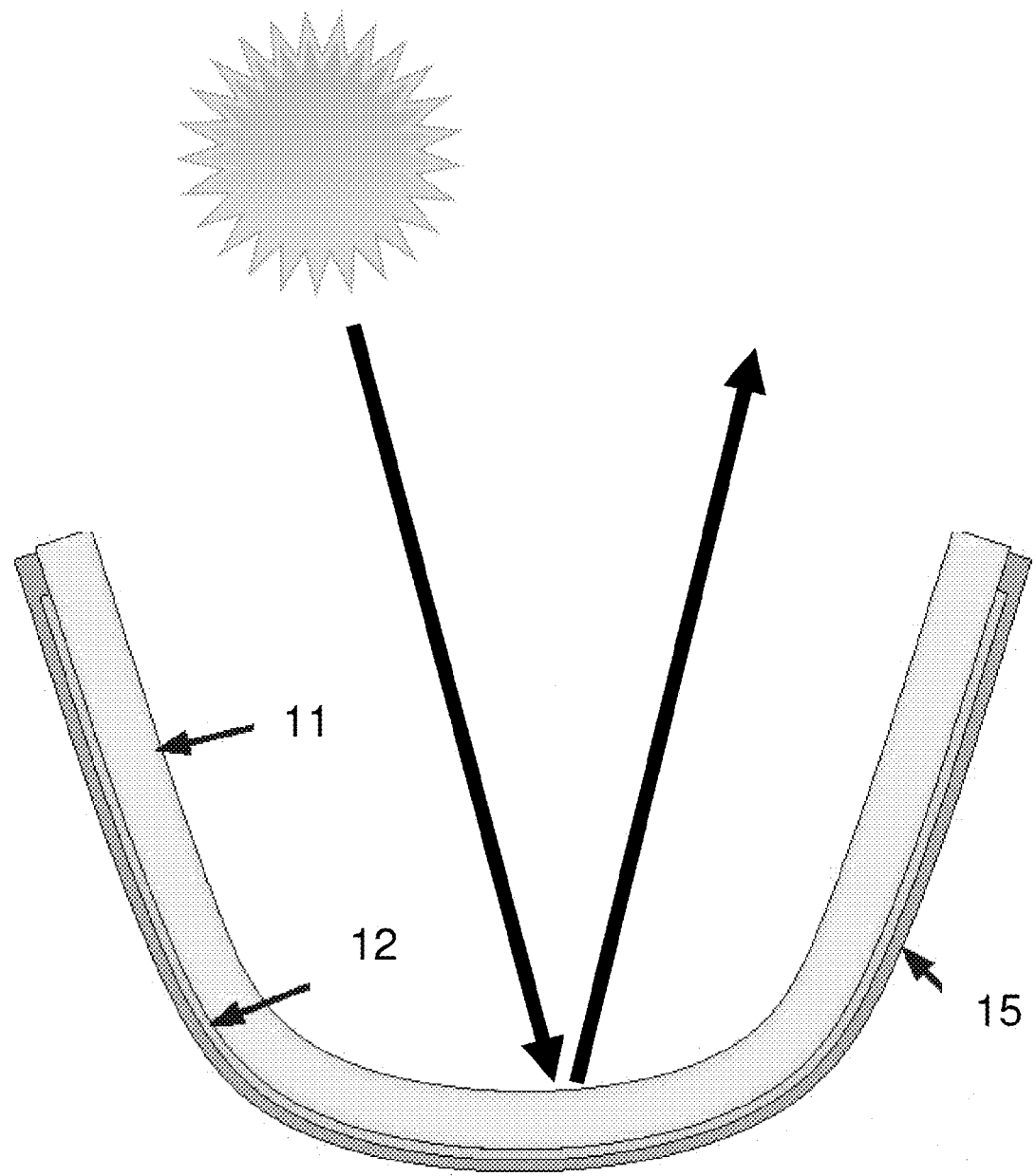
FIG. 3 is a schematic depiction of an embodiment of a multi-layer parabolic mirror assembly containing a barrier coating according to the present invention.

FIG. 3 demonstrates a preferred embodiment in which the reflective optical construction is in a parabolic form. The reflective layer 12 is disposed on the back of the substrate 11, and the barrier coating layer 15 encloses the reflective layer 12 so as to prevent any moisture or corrosive gases from contacting the reflective layer 12.

In certain embodiments, the barrier coating includes at least one polymer represented by Formula (I):

wherein n is from about 10 to about 2,500, $R_1$, $R_2$, and $R_3$ are independently selected from H and F, and the polymer has a molecular weight from about 2,000 and about 200,000 Daltons, preferably from about 10,000 and about 100,000 Daltons, and more preferably from about 23,000 and about 150,000 Daltons.

Preferred barrier coatings maybe formed by any methods know by those skilled in the art. In preferred aspects, the formation methods comprise polymerizing a fluorocarbon compound of the general formula $CF_3CR_1{=}CR_2R_3$, wherein $R_1$, $R_2$, and $R_3$ are independently H or F, in the presence of an initiator and under suitable reaction conditions. After forming the polymer, acid may be added to precipitate the polymer.

The precipitated polymer may then be filtered, dried, and combined with another solvent to form a barrier coating solution. In preferred embodiments, the barrier coating solution is then applied to a reflective layer disposed on a substrate and cured to form a reflective optical construction.

A variety of commercially available hydrofluoro-olefins ("HFOs") may be used as the monomer(s) to form the polymer. Suitable HFOs may have the general formula $CF_3CR_1 \!=\! CR_2R_3$, wherein $R_1$, $R_2$, and $R_3$ are each selected from H and F. Examples of suitable HFOs include tetrafluoropropene compounds and pentafluoropropene compounds. A particularly suitable tetrafluoropropene compound is 2,3,3,3-tetrafluoropropene ("HFO-1234yf"), which forms a polymer having the following Formula (II):

(II)

wherein n=10 and about 2,500.

Other suitable tetrafluoropropene compounds include HFO-1234zf and HFO-1234ze. Suitable pentafluoropropene compounds include HFO-1225. Stereoisomers of any of the foregoing compounds may also be suitable.

In one embodiment, the compounds referenced above may be copolymerized with additional co-monomer compounds, and in particular with additional halogenated co-monomers. Fluorinated co-monomer compounds include, without limitation, fluoroolefins, fluorinated vinyl ethers and fluorinated dioxoles. Monomers suitable as co-monomers include, without limitation, acrylic acid and esters thereof, methacrylic acid and esters thereof, ethylene, propylene, butylene, fluoroethylene (vinyl fluoride), 1,1-difluoroethylene (vinylidene fluoride, or vinylidene difluoride), 1,2-difluoroethylene, trifluoroethylene, tetrafluoroethylene, chlorotrifluoroethylene, chloroethylene, 1,1-dichloroethylene, 1,2-dichloroethylene, trichloroethylene, tetrachloroethylene, hexafluoropropylene, hexfluoroisobutylene, perfluorobutyl ethylene, perfluoro(methyl vinyl ether), perfluoro(ethyl vinyl ether), perfluoro(propyl vinyl ether), perfluoro-2,2-dimethyl-1,3-dioxole and perfluoro-2-methylene-4-methyl-1,3-dioxolane. In certain embodiments, preferred co-monomers include ethylene, propylene, butylene, fluoroethylene, 1,1-difluoroethylene, 1,2-difluoroethylene, trifluoroethylene, tetrafluoroethylene, chlorotrifluoroethylene, chloroethylene, 1,1-dichloroethylene, 1,2-dichloroethylene, trichloroethylene, and/or tetrachloroethylene. Co-monomers can comprise about 1 to about 90% of the fluoropolymer, preferably about 5 to about 75%, and more preferably about 10 to about 50%.

Polymerization is carried out in the presence of one or more free-radical initiators. Suitable initiators include azobiscyanoacrylates, aliphatic peresters such as t-butyl percotoate and t-amyl peroctoate, aliphatic peroxides such as t-butyl peroxide, aliphatic hydroperoxides such as t-butyl hydroperoxide, persulfates such as sodium persulfate, potassium persulfate, ammonium persulfate, and iron persulfate, and combinations of the foregoing. A persulfate initiator may be included in the reaction solution at a concentration of less than 20 weight %, more particularly less than 12 weight %, and even more particularly less than 1.0 weight % based on the total weight of the monomer.

The reaction between the polymer and initiator may be carried out in a solution including water, buffer, and/or a surfactant. Suitable buffers include $Na_2HPO_4$, $NaH_2PO_4$, $FeSO_4$, and combinations thereof. Particularly suitable buffers include sodium phosphate dibasic hepthahydrate, sodium phosphate monobasic, ferrous sulfate heptahydrate, and combinations thereof. Suitable surfactants include fluorosurfactants, more particularly perfluorinated carboxylic acid surfactants such as $C_8HF_{15}O_2$ and $C_7F_{15}CO_2(NH)_4$. Reducing agents such as $Na_2S_2O_5$ and additional solvents/diluents may also be added.

The reaction may be carried out in, for example, an autoclave or jacketed stirred tank reactor ("STR") via a batch or semi-batch mode at a temperature of from about 20° C. to about 85° C., preferably of from about 40° C. to about 60° C. Reaction times may range from about 30 minutes to about 48 hours, preferably from about 10 to about 24 hours. The resulting polymer may have a molecular weight between about 2,000 and 200,000 Daltons, preferably between about 10,000 to about 100,000 Daltons.

In one embodiment, a minor amount of peroxide as a finishing step may be added after the polymerization reaction has substantially ended. Such a finishing step has the purpose of removing unreacted monomers and aids. After completing polymerization, the polymer is precipitated from the emulsion by adding acid. The polymer precipitate is then filtered and dried.

A barrier coating solution is then formed by dissolving or dispersing the polymer in a suitable organic solvent. Suitable organic solvents generally include, for example, acetone, methyl acetate, ethyl acetate, and various ketones. The amount of solvent used to form the coating composition can be varied such that the solids concentration ranges from about 1 to about 25 weight percent, preferably from about 1 to about 10 weight percent, and more preferably from about 1 to about 5 weight percent depending upon the application method and/or performance requirements. In some embodiments, there may be manufacturing advantages to forming a coating concentrate, followed by diluting to the desired coating concentration. In alternate embodiments, dilution could occur prior to or during the initial mixing stage.

The barrier coating solution may be applied onto the reflective optical construction by a variety of generally known coating methods including spin-on, slot die, spray, dip, roller, and other coating techniques. For dip coating, a solids concentration of about 10 to about 20 weight percent may be suitable. For other coating methods such as spin, slot die, and spray, a lower solids concentration of about 1 to about 5 weight percent may be suitable. Embodiments of the present invention may be particularly suitable for spray application due to the relatively small polymer particle size of the fluoropolymer. The viscosity of the resulting coating solution may vary from between 0.5 cP to greater than 500 cP, preferably from about 0.5 cP to about 10 cP, and more preferably from about 0.75 cP to about 2.0 cP.

The barrier coating solution is applied to at least a portion of a surface of the reflective layer. The barrier coating solution is then cured to form a barrier coating on the reflective layer. The barrier coating solution can be subjected to a low temperature heat curing step, ranging from about 60° C. to about 350° C., preferably from about 150° C. to about 325° C., and more preferably from about 200° C. to about 250° C. Curing may be carried between 1 minute and about 1 hour, preferably from about 1 minute to about 15 minutes. The resulting coating may be, according to certain embodiments, non-porous. In certain embodiments, the barrier coating solution is applied onto a previously coated reflective layer.

The thickness of the barrier coating in the reflective optical construction is in the range of from about 1 micron to about 3 millimeters, preferably about 5 to about 1,000 microns, more preferably from about 10 to about 500 microns, and even more preferably from about 50 to about 100 microns. In order to achieve the appropriate thickness, two or more layers of the same or different barrier coatings can be applied back to back, with or without an adhesive layer between.

The barrier coating may also comprise an adhesive. In order to prevent corrosion in reflective optical constructions, adhesives, particularly those which come in direct contact with the reflective layers containing one or more metals, should not be corrosive to those metals. For example, the adhesive should be low in halide ions, particularly chloride, which corrodes both copper and silver.

In certain embodiments, a preformed sheet or film comprising polymers as described above is glued to the back of the reflective coating using an adhesive. Other embodiments of the invention may utilize any suitable method for applying a fluoropolymer to a surface, as known by those skilled in the art. The barrier coatings according to this invention may be used in other applications. It is also within the scope of the invention that other layers may be provided in the mirror assembly so that the barrier coating is considered disposed on the glass substrate even if other layers are provided therebetween.

EXAMPLES

The following example is provided for the purpose of illustrating the present invention, but without limiting the scope thereof.

Example 1

A homopolymer of 2,3,3,3-tetrafluoropropene is dissolved in ethyl acetate, with or without added adhesive, to form various coating compositions having polymer concentrations between about 1 wt % and about 20 weight %. The resulting barrier coating solutions are applied by spray coating, to the metal layer of glass mirror assemblies containing either a silver reflective layer or both a silver reflective layer and a copper back layer, and the resulting mirror assemblies are cured by heating. The barrier coatings thus made are hydrophobic, demonstrating a water contact angle of 110-130 degrees, which indicates a high level of moisture resistance. The exemplified reflective optical construction is found to maintain a substantially unchanged level of optical performance and demonstrates excellent durability under three different test conditions: (1) 85% relative humidity ("RH") at 85° C. for 1,000 hours; (2) standard QUV Accelerated Weathering testing conditions (e.g., ASTM G154 and/or AATCC TM186); and (3) 100% RH at 45° C. for 1,000 hours.

What is claimed is:

1. A reflective optical construction comprising:
   (a) an optically transparent substrate containing a reflective layer disposed on the back of said substrate; and
   (b) a barrier layer disposed on a portion of at least one surface of the reflective layer, the barrier layer comprising a fluoropolymer represented by Formula (I):

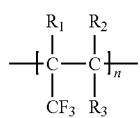

(I)

wherein said fluoropolymer is a tetrafluoropropene homopolymer or pentafluoropropene homopolymer, wherein n is a number from about 10 to about 2,500, $R_1$, $R_2$, and $R_3$ are independently selected from H and F, and wherein said barrier layer protects said reflective layer from corrosion.

2. The reflective optical construction of claim 1, wherein said fluoropolymer is represented by Formula (II):

(II)

wherein n is a number from about 15 to about 2,000.

3. The reflective optical construction of claim 1, wherein said fluoropolymer has a molecular weight between about 2,000 and about 200,000 Daltons.

4. The reflective optical construction of claim 1, wherein said fluoropolymer is derived from a tetrafluoropropene compound.

5. The reflective optical construction of claim 1, wherein said fluoropolymer is derived from a compound selected from the group consisting of HFO-1234yf, HFO-1234ze, and HFO-1225.

6. The reflective optical construction of claim 4, wherein said tetrafluoropropene compound consists essentially of HFO-1234yf.

7. The reflective optical construction of claim 1, wherein the thickness of said fluoropolymer barrier layer is between about 1 micron and about 3,000 microns.

8. A reflective optical construction comprising:
   (a) an optically transparent substrate containing a reflective layer disposed on the back of said substrate; and
   (b) a barrier layer disposed on at least a portion of at least one surface of the reflective layer, the barrier layer consisting essentially of at least one fluoropolymer selected from the group consisting of homopolymers derived from a tetrafluoropropene compound or a pentafluoropropene compound, wherein the fluoropolymer has a molecular weight between about 2,000 and about 200,000 Daltons; wherein said barrier layer is applied as a barrier coating solution, and wherein said barrier layer protects said reflective layer from corrosion.

9. The reflective optical construction of claim 8, wherein said fluoropolymer has a molecular weight between about 10,000 and about 100,000 Daltons.

10. The reflective optical construction of claim 8, wherein said tetrafluoropropene compound or pentafluoropropene compound is selected from the group consisting of HFO-1234yf, HFO-1234ze, and HFO-1225.

11. The reflective optical construction of claim 8, wherein said tetrafluoropropene compound consists essentially of HFO-1234yf.

12. A method of forming a reflective optical construction comprising:
   (a) applying a barrier coating solution to a reflective layer disposed on the back of an optically transparent substrate, the barrier coating solution comprising at least one fluoropolymer selected from the group consisting of homopolymers derived from a tetrafluoropropene compound or a pentafluoropropene compound, wherein the fluoropolymer has a molecular weight between about 2,000 and about 200,000 Daltons; and
   (b) curing the applied barrier coating solution to form a barrier layer on the reflective layer.

13. The method of claim 12, wherein the barrier coating solution is applied by spray coating.

14. The method of claim 12, wherein the curing step comprises heating to a temperature between about 60° C. and about 350° C.

15. The method of claim 12, wherein said tetrafluoropropene compound or pentafluoropropene compound is selected from the group consisting of HFO-1234yf, HFO-1234ze, and HFO-1225.

16. The method of claim 12, wherein said tetrafluoropropene compound consists essentially of HFO-1234yf.

17. The method of claim 12, wherein said barrier coating solution further comprises an organic solvent.

* * * * *